United States Patent [19]

Chung

[11] 4,000,793
[45] Jan. 4, 1977

[54] DRY FLUID DRIVE
[75] Inventor: Jackson Chung, Mishawaka, Ind.
[73] Assignee: Reliance Electric Company, Mishawaka, Ind.
[22] Filed: Apr. 30, 1975
[21] Appl. No.: 573,316
[52] U.S. Cl. ................................. 192/105 A; 64/26
[51] Int. Cl.² ......................................... F16D 37/00
[58] Field of Search ........... 192/105 A, 58 A, 58 B, 192/85 F, 58 R; 64/26

[56] References Cited

UNITED STATES PATENTS

| | | | |
|---|---|---|---|
| 1,848,616 | 3/1932 | Fottinger | 192/105 A |
| 2,702,617 | 2/1955 | Davies | 192/105 A |
| 2,706,547 | 4/1955 | Ranzi | 192/58 A |
| 2,844,782 | 7/1958 | Wentworth | 192/58 A |
| 2,901,074 | 8/1959 | Badin | 192/105 A |
| 2,910,160 | 10/1959 | Meder | 192/105 A |
| 3,460,658 | 8/1969 | Badin | 192/105 A |

FOREIGN PATENTS OR APPLICATIONS

| | | | |
|---|---|---|---|
| 1,192,887 | 5/1965 | Germany | 192/58 A |

*Primary Examiner*—Benjamin W. Wyche
*Attorney, Agent, or Firm*—Marmaduke A. Hobbs

[57] ABSTRACT

A dry fluid drive having a housing with a center axis about which the housing rotates, and a cavity therein concentric with the housing, a dry fluid in the cavity, and a rotor with two spaced sections disposed in the cavity with the hub of the rotor in alignment with the center axis of the housing. A reaction vane of generally annular configuration is connected to the housing at the periphery of the cavity and extends inwardly from the periphery between the rotor sections. The reaction vane is provided with openings such as spaces, notches or holes to facilitate uniform distribution of the dry fluid in the cavity as the housing accelerates to full operating rotational speed. The vane may be of either a straight or undulated configuration, and in the latter configuration, the grooves and ribs increase in magnitude from the outer periphery toward the center.

11 Claims, 10 Drawing Figures

DRY FLUID DRIVE

Dry fluid drives are extensively used to couple motors to the power input shafts of equipment, such as conveyors and machinery, which place an initial heavy starting load on the motor or are subjected to a large magnitude in variation of heavy loads from time to time in the normal operation of the equipment. One type of dry fluid drive, or coupling or clutch, as it is sometimes referred to, is disclosed in U.S. Pat. No. 2,813,606, for connecting two rotatable shafts in end to end relation, consisting of a casing mounted on and secured to one of the shafts for rotation therewith and having a rotor cavity therein, and a rotor disposed in the cavity and secured to a sleeve or bushing, which in turn is mounted on and secured to the other shaft for rotation therewith and for rotation relative to the casing. The cavity contains the dry fluid, normally consisting of small heat treated steel shot, which is thrown by centrifugal force transmitted from the drive shaft to the casing, and, as the drive shaft and casing accelerate in rotation, the shot initially permits slippage or relative rotation between the casing and rotor, and as the rotation approaches full or normal speed, it forms virtually a solid mass packed between the internal walls of the casing and rotor and effectively locking these components together. The slippage which occurs during the initial stages of starting, produces a smooth acceleration without placing an abrupt load on the motor or equipment, and the formation of the solid mass as the casing approaches full acceleration, results in freedom of slippage, giving 100 percent operating efficiency by the coupling in transmitting power from the drive shaft to the driven shaft.

This type of drive or coupling has many advantages over mechanical or other fluid couplings, in that smaller motors can be used in all or most installations, maintenance on the motors and equipment is significantly reduced by the smooth starting performance, the initial rush of electrical current is reduced to minimum duration, approaching the requirements of no-load starting, and the shock or strain from overloading during normal operation on the motor and equipment is eliminated or minimized. However, the foregoing dry fluid drives have certain inherent disadvantages or problems under certain operation conditions, these including a tendency of the drives to over-heat if slippage occurs over an appreciable period of time during starting and acceleration or while the motor and equipment coupled by the drive are operated at frequent intervals or for an extended period of time in an overloaded condition. Other disadvantages include the necessity of relatively large drives for certain installations, and the inability of the shot to distribute itself uniformly efficiently and effectively during acceleration, causing vibration in the drives which may in some instances be transmitted to the motors and equipment. The latter problem reduces the effectiveness of the drives, particularly in vertical shaft orientation applications. Attempts have been made in the past to obtain more torque with compact drive structures, one of these consisting in utilizing two rotors disposed in separate cavities in the housing, thus in effect forming a dual or multiple housing structure. In this type, the surface of the inner or intermediate walls may be of the same configuration as the surface of the two outer walls defining the cavities or they may have a somewhat different configuration such as disclosed in U.S. Pat. No. 2,901,074. While improved torque characteristics resulted, the unit is relatively inefficient when its increased size over the conventional single cavity drive is taken into consideration. It is therefore one of the principal objects of the present invention to provide a dry fluid drive of the aforesaid type which will develop greater torque than the present standard drives of this type with a small and compact structure, and which has good heat dissipating characteristics and hence is capable of operating under loads producing slippage between the casing or housing and the rotor during starting and overload conditions without becoming overheated.

Another object of the invention is to provide a dry fluid drive having a rotatable housing and a rotor operatively interconnected by a mass of steel shot, in which the shot is readily distributed uniformly in the housing as the drive initially accelerates, and which can effectively be used in any position, either horizontal or vertical orientation, without significant imbalance resulting from maldistribution of the shot.

Still another object of the invention is to provide a dry fluid drive of the aforesaid type which is so constructed and designed that it will give long trouble-free service with little wear on the moving parts, and which, because of its compact structure and high torque under load, has a wide application in motor and machine installations.

Further objects and advantages of the present invention will become apparent from the following description and accompanying drawings, wherein.

Figure 1:
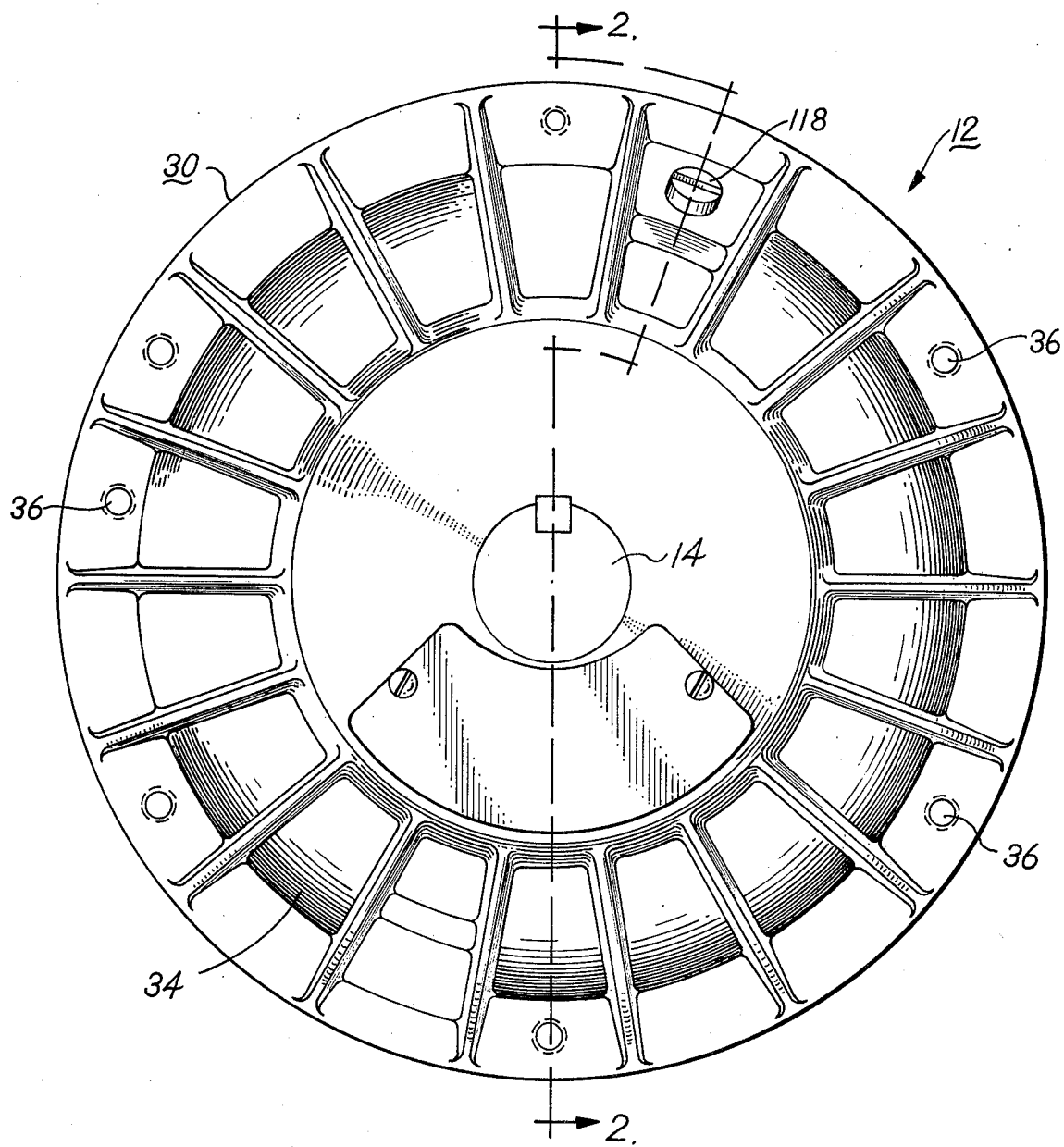
FIG. 1 is a side elevational view of a dry fluid drive showing a shaft on which it is mounted.
Figure 2:
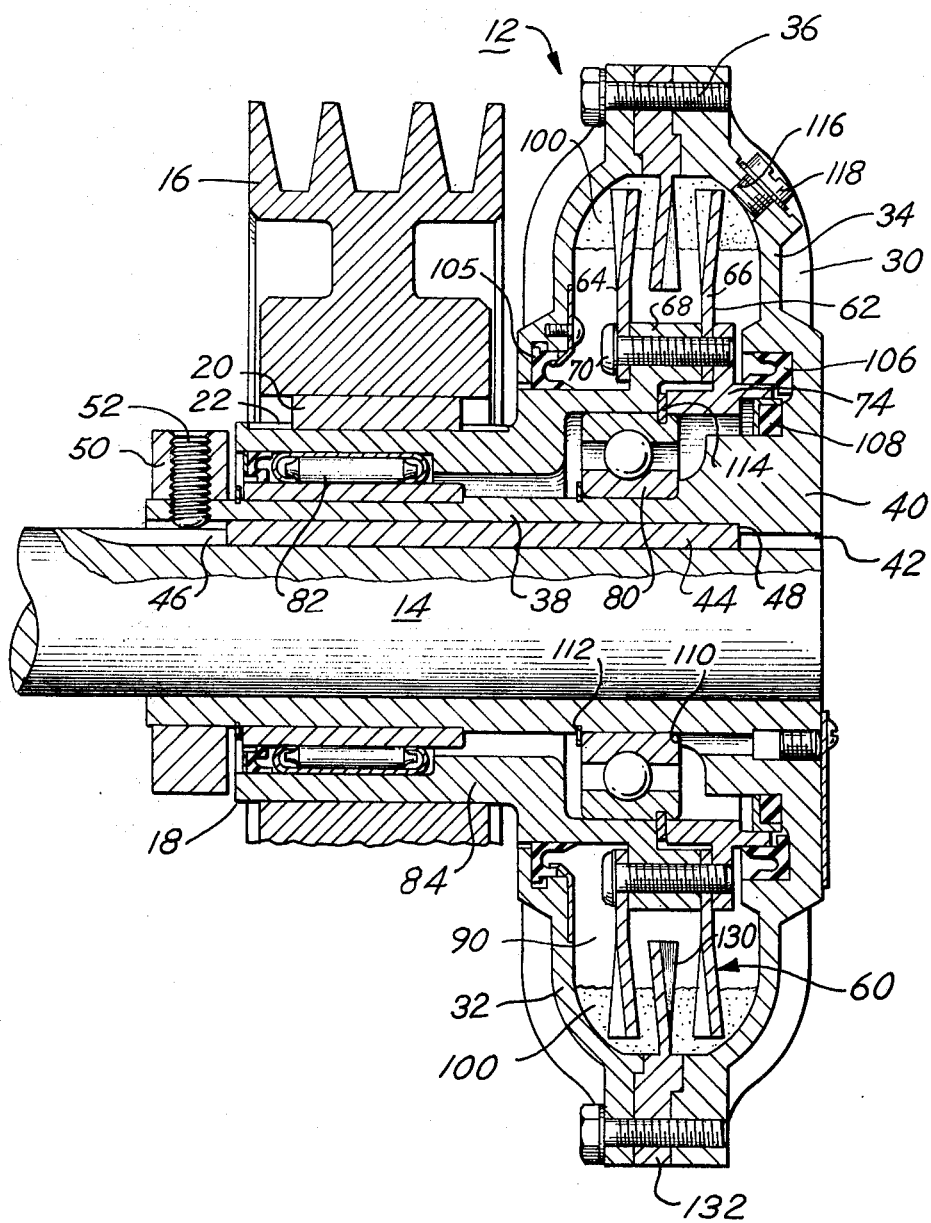
FIG. 2 is an axial cross sectional view of the drive shown in FIG. 1, the section being taken on line 2 — 2 of FIG. 1.

Referring more specifically to the drawings, and to FIGS. 1 and 2 in particular, numeral 12 indicates generally a dry fluid drive embodying the present invention, showing the drive mounted on the shaft 14 of a motor or other power source, not shown. The drive embodying the present invention may be used in a number of different types of installations, including, for example, with a sheave and belt or belts to a machine or other equipment or with two shafts in end-to-end relation, thereby operating as a coupling, either alone or in conjunction with other types of couplings such as flexible couplings, to allow for misalignment of the two shafts. In the embodiment illustrated in the drawings, a sheave 16 for a multiple V belt drive, is mounted on and connected to drive 12 on the cylindrical projection 18 with a key and key-way 20 and 22, respectively, being used as a means for securing the sheave to the drive.

The drive 12 consists of a housing having two sections 32 and 34 secured together to form a rigid unit by a plurality of screws 36 extending through holes disposed around the peripheral margin of the two sections. The two sections have inwardly extending side walls, and section 34 has a laterally extending sleeve 38 joined integrally with its side wall at base portion 40 so that the housing and sleeve rotate together. Sleeve 38 has a bore 42 for receiving shaft 14, which is secured to the sleeve by a key 44 in key-ways 46 and 48 in the shaft and sleeve, respectively. A collar 50, having one or more set screws 52 extending radially therein, is preferably mounted on sleeve 38 and, when the drive is mounted on shaft 14, the set screws extend through the sleeve and engage either the shaft or key 44, thus assisting in securing the drive rigidly to the motor shaft.

As shown in FIG. 2, a rotor assembly, indicated generally by numeral 60, includes a rotor 62 having two rotor sections or blades 64 and 66 secured to a hub 68 by a plurality of screws 70 which extend through holes 72 in the blades and through bores in the hub and are received in threaded holes in a retainer ring 74. The hub is supported by a ball bearing 80 and needle bearing 82 for rotation relative to the housing, the rotor assembly having a sleeve 84 extending laterally from the principal part of the housing and being disposed coaxially with sleeve 38 and shaft 14. A sheave, gear or sprocket may be mounted on sleeve 84 using key and key-ways 20 and 22 to secure the element in place, sheave 16 being shown to illustrate one application of the drive.

The housing contains a cavity 90 in which the two rotor sections 64 and 66 revolve on hub 68. The cavity contains a dry fluid, for example, heat treated steel shot, indicated by numeral 100, the shot being shown in FIG. 2 lodged in the periphery of the cavity and along the outer edge of rotor sections 64 and 66, thus assuming the position occupied when the drive is in operation. Under inoperative conditions, the shot falls to the bottom of the cavity and remains there until the housing is rotated, at which time the centrifugal force causes the shot to distribute itself uniformly around the periphery of the cavity as shown in the drawing. Dry fluids other than steel shot may be used; however, the steel shot has been found satisfactory and will give optimum performance in the drive over extended periods of time.

The rotor sections 64 and 66 may be of different configurations, the ones shown consisting of undulations having radially extending grooves 102 and corresponding ribs 104. The two sections are preferably constructed of steel sheet or plate material, heat treated and/or coated to provide a hard, long wearing surface unaffected appreciably by abrasive action resulting from frictional engagement with the steel shot. Since the housing rotates relative to the rotor assembly, the internal surface of the housing defining cavity 90 may have a configuration such as ribs and grooves to increase the torque output of the drive. However, slippage between the rotor sections and the housing is essential for proper operation of the drive, in that the slippage permits a soft start followed by a substantial reduction of slippage, until a solid connection is obtained between the rotor sections and the housing when the shot is lodged in mass at the periphery of cavity 90. The housing and rotor assembly are sealed to fully enclose cavity 90 by seals 105, 106 and 108.

The ball bearing is held in position on the housing sleeve 38 by an annular shoulder 110 and a snap ring 112 disposed in a groove in sleeve 38. Likewise, the rotor assembly is held from axial movement relative to the housing by a snap ring 114 disposed in a groove in the outer race of bearing 80 and between the inner end of sleeve 84 and retainer 74. The shot or other dry fluid is added to chamber 90 through an opening 116 which is normally closed by a screw plug 118, threadedly received in opening 116.

Figure 3:
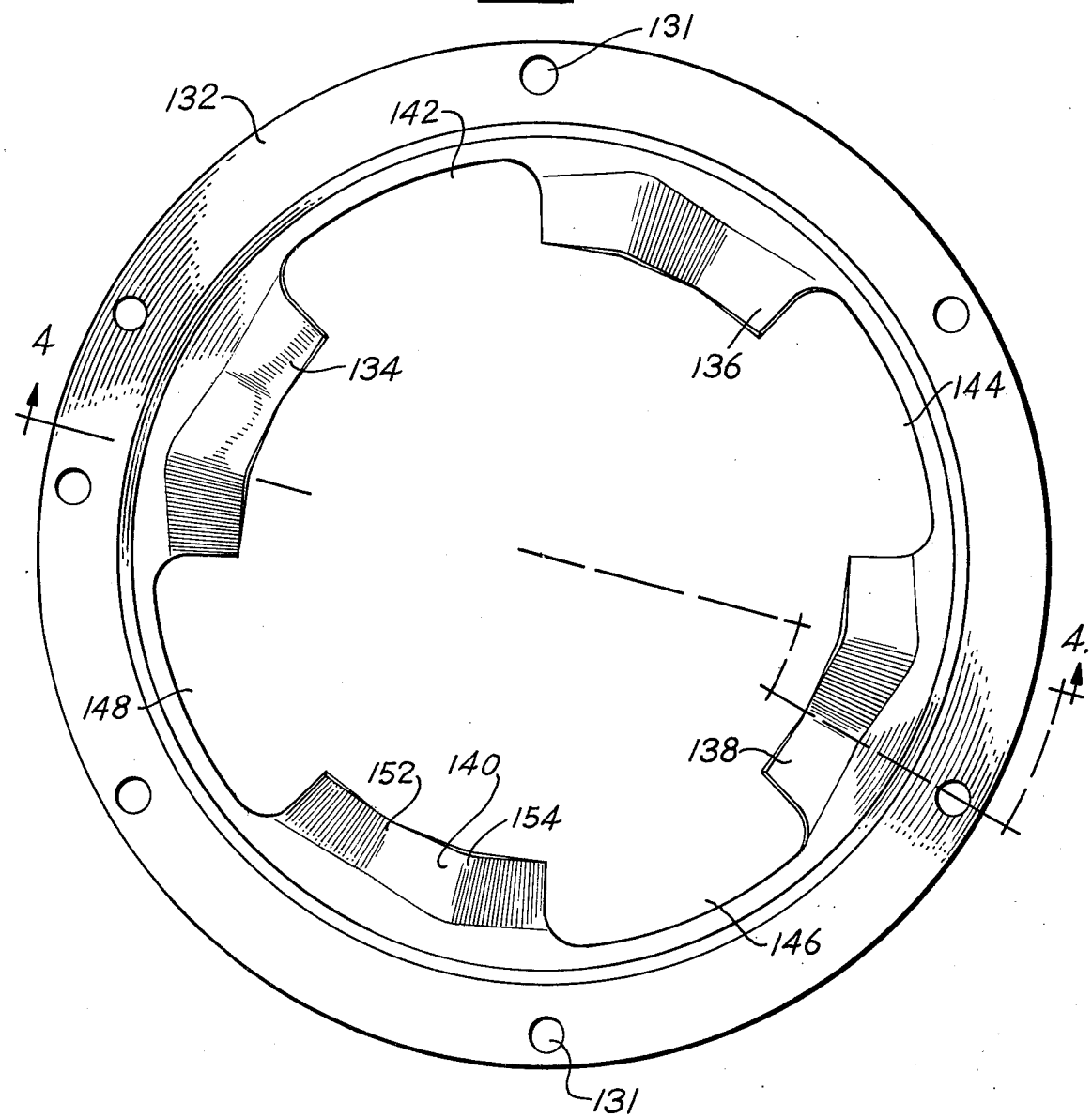
FIG. 3 is a side elevational view of the reaction vane or ring removed from the drive.

One of the primary features of the present invention is the incorporation of a reaction vane or ring 130 between the two rotor sections 64 and 66, the vane being clamped at its base 132 between housing sections 32 and 34 by screws 36 extending through holes 131 in the outer ring or base 132. The reaction vane is held firmly in place in spaced relationship to the inner facing surfaces of the two rotor sections but preferably relatively close thereto so that improved torque characteristics are obtained by the interaction of the two rotor sections and the vane in combination with the dry fluid, and good heat transfer and dissipation are achieved from the rotor sections and vane, during the acceleration and full operation of the drive. One type of vane is illustrated in FIG. 3, consisting of annular base 132 and segments 134, 136, 138 and 140, the four segments being separated by substantial spaces or notches indicated generally by numerals 142, 144, 146 and 148, the spaces being provided to permit the dry fluid to readily distribute itself uniformly on opposite sides of the vane and to assist in distributing the dry fluid on opposite sides of the two vane sections. Each of the two vane sections may have a plurality of holes 150 disposed around the periphery to further assist in distributing the dry fluid equally between the vane and the two rotor sections. In order to facilitate heat transfer from the rotor sections to the vane and thence to the housing and ambient air, the spacing between the vane and rotor sections is preferably rather small, normally smaller than the spacing between the rotor sections and the radial side walls of the housing.

Figure 4:
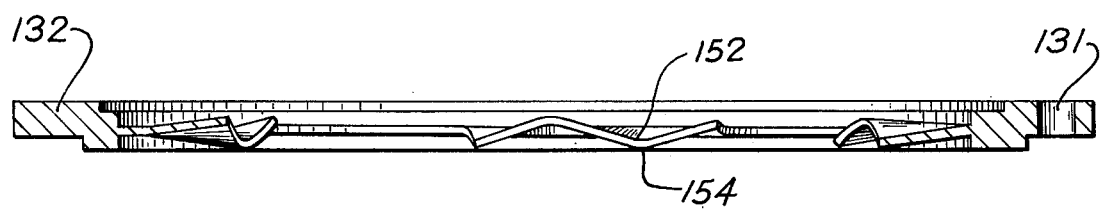
FIG. 4 is a cross sectional view of the vane or ring shown in FIG. 3, the section being taken on line 4 — 4 of the latter figure.
Figure 5:
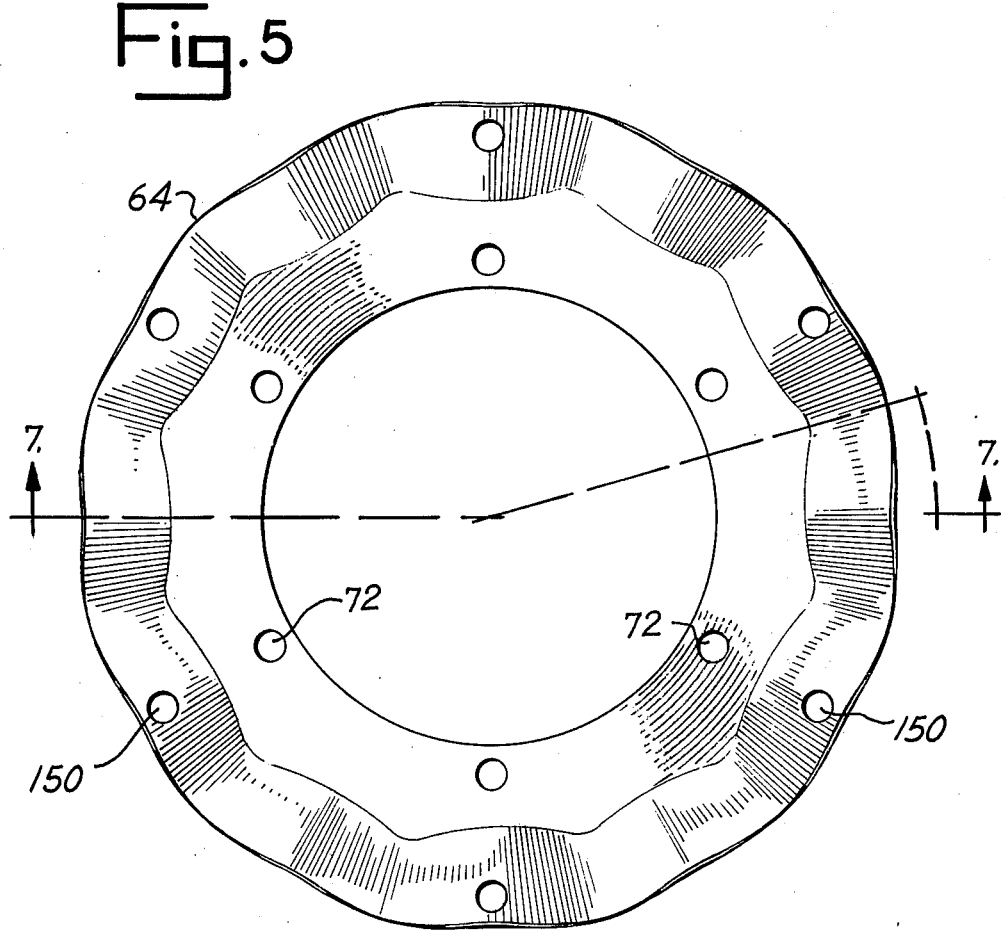
FIG. 5 is a side elevational view of one of the principal parts of the rotor used in the drive.
Figure 6:
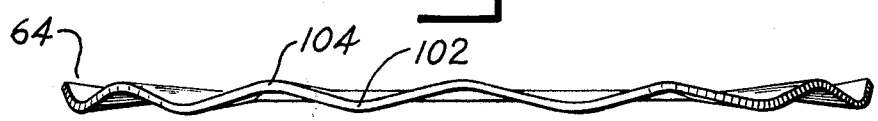
FIG. 6 is an edge elevational view of the rotor part shown in FIG. 5.
Figure 7:
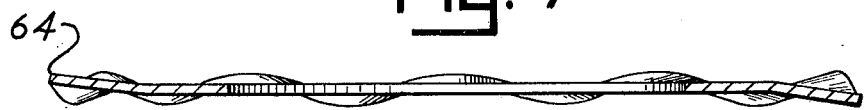
FIG. 7 is a transverse cross sectional view of the rotor part shown in FIG. 5, the section being taken on line 7 — 7 of the latter figure.
Figure 8:
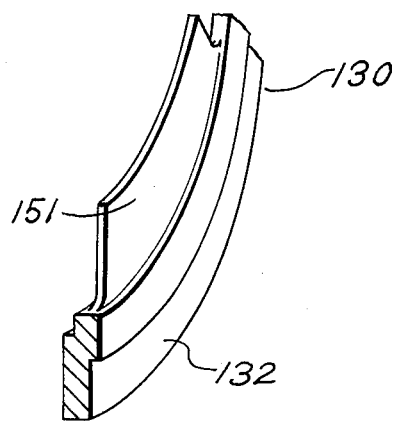
FIG. 8 is a fragmentary, cross sectional view illustrating a modified form of the reaction vane.

The segments of the vane may be either straight or flat, as illustrated in FIG. 8, at numeral 151, or they may be undulated with radial grooves and ridges 152 and 154. It should be noted that, in the embodiment of FIGS. 3 and 4, the undulations on the reaction segments of the reaction vane increase in depth from the outside toward the center, whereas the undulations on the two rotor sections increase in depth from the hub toward the periphery. The undulations on the vane segments may be the same as or different from the undulations on the rotor sections. The inner edge of spaces, openings or notches 142, 144, 146 and 148 may be flush with the periphery of the surface defining cavity 90 or they may project inwardly a relatively short distance beyond the periphery and thus form, along with the four segments, an additional radial reaction surface adjacent the tip of the rotor sections.

While the effective operative parts of the reaction vane are shown as spaced segments, other shapes and configurations may be used if desired; however, for effective or optimum operation, provisions should be made in most installations for uniform distribution of the dry fluid on either side of the reaction vane. A continuous vane having spaced holes therein connecting the area on either side of the vane may be used in place of the four slots; however, the preferred embodiment involves the use of the segment with intervening openings, slots or notches. In the claims, the term "opening therethrough" (vane) is intended to include notches, slots and holes or any other opening extending from one side of the vane to the other for facilitating uniform distribution of the dry fluid between the rotor sections and the vane or vanes.

In the operation of the dry fluid drive described hereinbefore, with the drive mounted on the motor shaft 14 and belts connected to the sheave 16, rotation of shaft 14 rotates housing 30. As the housing accelerates in rotation, the dry fluid 100 in cavity 90, which had settled to the bottom is thrown by centrifugal force to the periphery of the cavity between the rotor sections and the vane, thereby transmitting the torque from reaction vane 130 and from the inner walls of the housing to rotor sections 64 and 66. The torque transmitted to the rotor sections is thence transmitted through sleeve 84 to sheave 16. If there is any appreciable load on the equipment to be driven by the drive, substantial slippage may initially occur between the rotor sections and vane 130 and the housing walls. As the housing continues to rotate, the dry fluid is lodged firmly at the periphery of the cavity in the areas between the reaction vane and the two rotor sections and between the housing walls and the two rotor sections, thus ultimately forming a solid connection between the housing and rotor assembly so that the drive is 100 percent efficient in transmitting torque from shaft 14 to sheave 16. The vane operates primarily as a reaction member and heat dissipation fin, and hence permits the use of a smaller, more compact overall structure to obtain the same torque along with a smooth start and without overheating while under heavy load.

Figure 9:
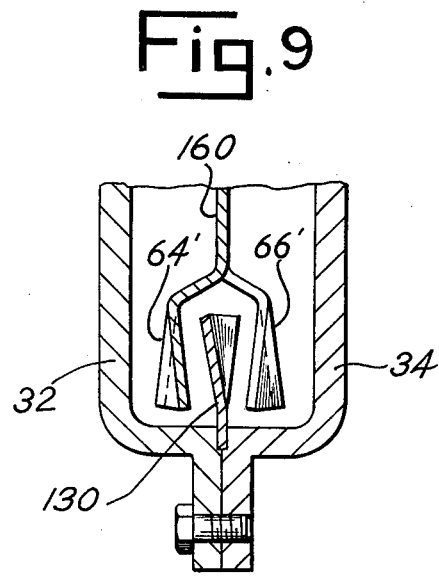
FIG. 9 is a fragmentary, cross sectional view illustrating a modified form of the present invention.
Figure 10:
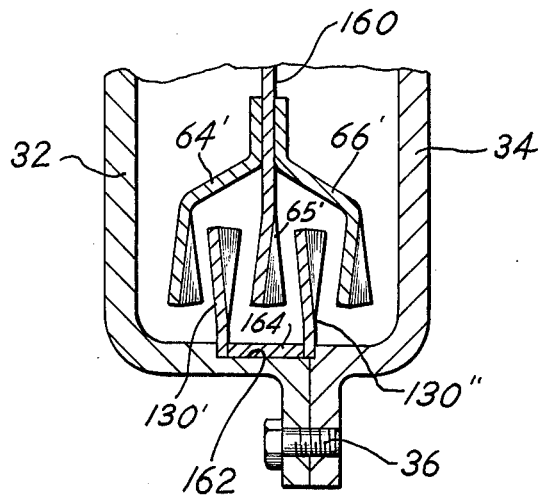
FIG. 10 is a fragmentary cross sectional view of a further modified form of the present invention.

FIGS. 9 and 10 illustrate modified forms of the present invention described previously herein, and like numerals will be used to refer to like parts. In FIG. 9 a reaction vane similar to 130 is mounted between sections 32 and 34 of the housing. In this modification, the two sections of the rotor 64' and 66' are connected to a common center portion 160, which in turn is connected to the hub, rather than the two sections being connected directly to the hub. The operation of this type is essentially the same as the operation of the previously described embodiment, and the reaction vane is preferably provided with openings 142, 144, 146 and 148, and the rotor sections with holes similar to holes 150, in order to obtain effective distribution of the dry fluid in the cavity during the operation of the drive. FIG. 10 is similar to FIG. 9, except that three rotor sections 64', 65' and 66' are connected to a common center 160, and two vanes 130' and 130" are used, the two vanes being secured in the housing by seating in a slot 162 and being held therein by an annular insert 164 when sections 32 and 34 of the housing are secured together by screws 36. Multiple reaction vanes improve the torque and heat dissipation characteristics of the drive, and at the same time permit the use of a relatively small unit without sacrificing the initial smooth starts. The concept of the multiple vanes is an extension of the single vane concept disclosed in the prior figures. The vanes may be of different shapes, such as that disclosed in FIGS. 3 and 4, or as that disclosed in FIG. 8.

While only one embodiment of the present invention and two modifications thereof have been described in detail herein, various changes and further modifications may be made without departing from the scope of the invention.

I claim:

1. A dry fluid drive comprising a housing having a center axis about which said housing rotates and a cavity therein concentric with said housing, a dry fluid in said cavity, a rotor assembly disposed in said cavity having a hub in alignment with the center axis of said housing and extending axially from the housing, said rotor having two sections in axially spaced relation at the periphery, and a reaction vane of generally annular configuration disposed between said rotor sections extending inwardly from the periphery of the cavity and having a plurality of spaced slots in the inner edge thereof, producing a series of equally spaced vane segments with openings therebetween for distributing said dry fluid in said cavity between said rotor sections and said vane, said vane having an effective surface of an undulated configuration with the ribs and grooves being generally radially disposed.

2. A dry fluid drive as defined in claim 1 in which said undulations increase in magnitude from the periphery of said cavity toward the center thereof.

3. A dry fluid drive as defined in claim 2 in which the undulations of the rotor sections and the undulations of the reaction vane are substantially the same magnitude.

4. A dry fluid drive as defined in claim 1 in which said rotor sections have an undulating configuration with the grooves and ribs extending in a generally radial direction.

5. A dry fluid drive as defined in claim 4 in which said rotor sections have an undulating configuration with the grooves and ribs extending in a generally radial direction.

6. A dry fluid drive as defined in claim 5 in which the ribs and grooves of the undulations extend in a generally radial direction and increase in magnitude from said hub toward the periphery of said cavity.

7. A dry fluid drive as defined in claim 1 in which said housing has a laterally extending sleeve and said rotor assembly has a laterally disposed sleeve around said first mentioned sleeve and concentric therewith, and means on said latter sleeve for securing a driven element thereto.

8. A dry fluid drive as defined in claim 7 in which said housing has a laterally extending sleeve and said rotor assembly has a laterally disposed sleeve around said first mentioned sleeve and concentric therewith, and means on said latter sleeve for securing a driven element thereto.

9. A dry fluid drive as defined in claim 1 in which said dry fluid is steel shot.

10. A dry fluid drive as defined in claim 1 in which said dry fluid is heat treated shot and the effective surfaces on said vane are abrasive resistant.

11. A dry fluid drive comprising a housing having a center axis about which said housing rotates and a cavity therein concentric with said housing, a dry fluid in said cavity, a rotor assembly disposed in said cavity having a hub in alignment with the center axis of said housing and extending axially from the housing, said rotor having a plurality of sections in axially spaced relation at the periphery, and a plurality of reaction vanes of generally annular configuration disposed alternately between said rotor sections and extending inwardly from the periphery of the cavity, said vanes having a plurality of spaced slots in the inner edge thereof, producing a series of equally spaced vane segments with openings therebetween for distributing said dry fluid in said cavity between said rotor sections and said vane, said vanes having an effective surface of an undulated configuration with the ribs and grooves being generally radially disposed.

* * * * *